US012362791B2

(12) United States Patent
Wang et al.

(10) Patent No.: US 12,362,791 B2
(45) Date of Patent: Jul. 15, 2025

(54) NETWORK NODE AND METHOD FOR CREATING A PRECODER IN A WIRELESS COMMUNICATIONS NETWORK

(71) Applicant: Telefonaktiebolaget LM Ericsson (publ), Stockholm (SE)

(72) Inventors: Zhao Wang, Täby (SE); Xueying Hou, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 70 days.

(21) Appl. No.: 18/266,868

(22) PCT Filed: Dec. 14, 2020

(86) PCT No.: PCT/SE2020/051207
§ 371 (c)(1),
(2) Date: Jun. 13, 2023

(87) PCT Pub. No.: WO2022/131972
PCT Pub. Date: Jun. 23, 2022

(65) Prior Publication Data
US 2024/0056137 A1 Feb. 15, 2024

(51) Int. Cl.
H04B 7/04 (2017.01)
H04B 7/0456 (2017.01)

(52) U.S. Cl.
CPC ................ H04B 7/0456 (2013.01)

(58) Field of Classification Search
CPC .... H04B 7/0456; H04B 7/0695; H04B 7/088; H04B 7/0617
(Continued)

(56) References Cited

U.S. PATENT DOCUMENTS 11,757,543 B2    9/2023  Chervyakov et al.
2010/0099362 A1  4/2010  Jongren et al.
(Continued)

FOREIGN PATENT DOCUMENTS

EP    3413484 A1      12/2018
WO    2020068931 A1   4/2020
WO    2020161537 A1   8/2020

OTHER PUBLICATIONS

Rahman, et al., "CSI feedback based on space-frequency compression," 17th Annual Consumer Communications & Networking Conference, Jan. 10-13, 2020, Las Vegas, Nevada, 6 pages.
(Continued)

Primary Examiner — Emmanuel Bayard
(74) Attorney, Agent, or Firm — Withrow & Terranova, PLLC

(57) ABSTRACT

A method performed by a network node for creating a precoder for forming a Downlink, DL, beam between the network node and a User Equipment, UE, which DL beam is for reciprocity-based Multiple Input Multiple Output, MIMO, communication in a wireless communications network is provided. The network node obtains matched filter channel estimates for an Uplink, UL, signal, based on a reference signal from the UE known by the network node. The network node obtains a hypothesis testing space within a first precoder codebook, of one polarization, based on the matched filter channel estimates. The network node selects a set of precoder candidates out of the first precoder codebook in accordance with the hypotheses testing space. The network node creates the precoder for forming the DL beam between the network node and the UE, based on calculating a linear combination of the precoder candidates in the set of precoder candidates.

11 Claims, 10 Drawing Sheets

(58) Field of Classification Search
USPC .................................. 375/143, 267, 350
See application file for complete search history.

(56) References Cited

U.S. PATENT DOCUMENTS

| | | | |
|---|---|---|---|
| 2013/0039235 | A1 | 2/2013 | Rahman et al. |
| 2014/0307645 | A1 | 10/2014 | Ji et al. |
| 2015/0092824 | A1 | 4/2015 | Wicker, Jr. et al. |
| 2015/0381335 | A1 | 12/2015 | Khojastepour et al. |
| 2016/0073370 | A1 | 3/2016 | Axmon et al. |
| 2016/0219506 | A1 | 7/2016 | Pratt et al. |
| 2017/0149591 | A1 | 5/2017 | Manolakos et al. |
| 2017/0264349 | A1 | 9/2017 | Kant et al. |
| 2019/0036578 | A1 | 1/2019 | Zirwas et al. |
| 2019/0356420 | A1* | 11/2019 | John Wilson ........ H04B 7/0408 |
| 2020/0220591 | A1 | 7/2020 | Zhang et al. |
| 2020/0252112 | A1 | 8/2020 | Zhan et al. |
| 2020/0304182 | A1 | 9/2020 | Ibrahim et al. |
| 2020/0373975 | A1 | 11/2020 | Li et al. |
| 2021/0359828 | A1* | 11/2021 | Levitsky ............. H04L 25/0222 |
| 2022/0123971 | A1* | 4/2022 | Malek-Mohammadi .................... H04L 25/0224 |
| 2022/0368498 | A1* | 11/2022 | Sun ....................... H04L 5/0094 |
| 2023/0269779 | A1 | 8/2023 | Babaei |

OTHER PUBLICATIONS

Zte, "R1-1813913: CSI Enhancement for MU-MIMO Support," 3GPP TSG RAN WG1 Meeting #95, Nov. 12-16, 2018, Spokane, Washington, 11 pages.
International Search Report and Written Opinion for International Patent Application No. PCT/SE2020/051207, mailed Sep. 1, 2021, 11 pages.
Invitation to Pay Additional Fees and Partial Search for International Patent Application No. PCT/IB2019/059678, mailed Jan. 23, 2020, 15 pages.
International Search Report and Written Opinion for International Patent Application No. PCT/IB2019/059678, mailed Mar. 17, 2020, 21 pages.
Samsung, "R1-1813002: Summary of CSI enhancement for MU-MIMO support," 3GPP TSG RAN WG1 Meeting #95, Nov. 12-16, 2018, Spokane, Washington, 9 pages.
Extended European Search Report for European Patent Application No. 20966101.6, mailed Jul. 22, 2024, 9 pages.
Examination Report for European Patent Application No. 19805409.0, mailed Jan. 3, 2024, 9 pages.
Non-Final Office Action for U.S. Appl. No. 17/428,841, mailed Sep. 21, 2023, 11 pages.
Notice of Allowance for U.S. Appl. No. 17/428,841, mailed Jan. 25, 2024, 8 pages.

* cited by examiner

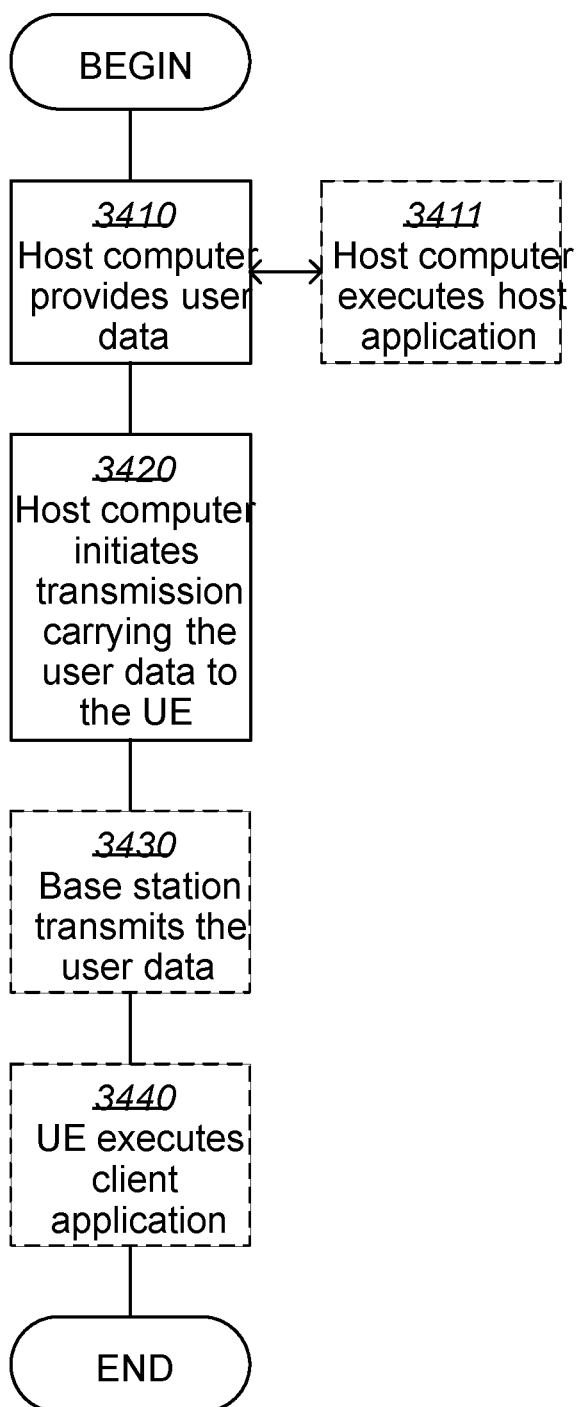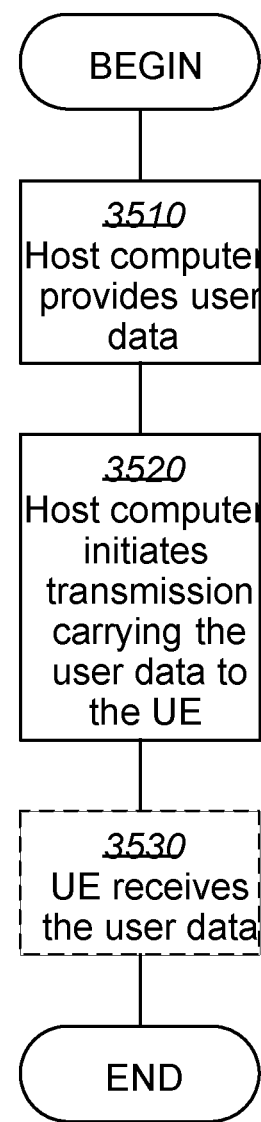
FIG. 9
FIG. 10

NETWORK NODE AND METHOD FOR CREATING A PRECODER IN A WIRELESS COMMUNICATIONS NETWORK

This application is a 35 U.S.C. § 371 national phase filing of International Application No. PCT/SE2020/051207, filed Dec. 14, 2020, the disclosure of which is incorporated herein by reference in its entirety.

TECHNICAL FIELD

Embodiments herein relate to a network node and a method therein. In some aspects, they relate to creating a precoder for forming a Downlink (DL) beam between the network node and a User Equipment (UE). The DL beam is for reciprocity-based Multiple Input Multiple Output (MIMO) communication in a wireless communications network.

BACKGROUND

In a typical wireless communication network, wireless devices, also known as wireless communication devices, mobile stations, stations (STA) and/or User Equipments (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a network node such as a radio access node e.g., a Wi-Fi access point or a radio base station (RBS), which in some networks may also be denoted, for example, a NodeB, eNodeB (eNB), or gNB as denoted in Fifth Generation (5G) telecommunications. A service area or cell area is a geographical area where radio coverage is provided by the network node. The network node communicates over an air interface operating on radio frequencies with the wireless device within range of the network node.

Specifications for the Evolved Packet System (EPS), also called a Fourth Generation (4G) network, have been completed within the 3rd Generation Partnership Project (3GPP) and this work continues in the coming 3GPP releases, for example to specify a 5G network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

MIMO Communication

Spatial diversity is a wireless diversity scheme that uses two or more antennas to improve the quality and reliability of a wireless link. This is because multiple antennas offer a receiver several observations of the same signal.

MIMO communication is a technique for serving several UEs simultaneously with the same time and frequency resource in a wireless communication network. This technique, in which a network node such as a gNB and/or UEs are equipped with multiple antennas, allows for spatial diversity to transmit data in both Uplink (UL) and DL directions. The obtained spatial diversity increases the capacity of the network dramatically, and it offers a more efficient utilization of the frequency spectrum. Moreover, MIMO reduces inter-cell and intra-cell interferences which in turn, leads to more frequency re-use. As the electromagnetic spectrum is a rare resource, MIMO is a vital solution for the extension of the capacity of wireless communication systems.

Reciprocity-Based Precoding in MIMO

A key point for effective deployment of the MIMO communication technology is the access to estimate of the channel responses between a gNB and UEs in an associated network cell, which is referred to as Channel State Information (CSI). These channel responses include those in DL and UL transmissions and help to form a beam from a gNB toward intended UEs. Beamforming is a technique that focuses a wireless signal towards a specific receiving device, rather than having the signal spread in all directions from a broadcast antenna, as it normally would. The resulting more direct connection is faster and more reliable than it would be without beamforming. A channel in the UL direction is usually estimated using pilot symbols, e.g. reference signals, sent by the UEs and received by the gNB, e.g. often referred to as sounding, and may for example be implemented as Sounding Reference Symbols in 3GPP LTE and NR.

For a Time Division Duplex (TDD) based system, it is possible to apply the physical channel property of reciprocity and use the UL sounding and channel estimation to obtain the DL channel estimates as well, this is referred to as reciprocity-based MIMO communication. The DL channel estimates, consequently, may be used to calculate a weight for the beamforming. In fact, the reciprocity-based algorithms for beamforming in a DL transmission are amongst the most successfully exploited algorithms in MIMO and are predicted to be widely exploited in the 5G cellular wireless communication networks. This class of algorithms are applicable whenever the so-called channel reciprocity holds. More precisely, they assume that the channel responses in the uplink and downlink directions are the same up to a change in the role of the transmitter and receiver and disregarding output power differences. Using this fact, they use the estimated channel in the uplink direction for beamforming in the downlink. This principle holds, when time-division multiplexing is used for sharing data transmission time between the DL and UL transmissions. In summary, in a reciprocity-based beamforming, from the previously transmitted pilot symbols from the UEs to the gNB, the UL channels are estimated, then these estimates will be valid in the DL direction by transposing the channel matrices.

Feedback-Based Precoding

Another way to obtain information about a channel between a gNB and UEs is to use information fed back by the UEs to the gNB. More specifically, in this method, the gNB and the UEs share a common set of precoding matrices which is usually referred to as the codebook. A codebook is a set of precoders, also referred to as a set of precoding matrices. Each precoding matrix in the codebook has complex value elements, that transforms a sequence of data symbols to another sequence of data symbols, and then maps to each antenna port of a radio device such as the gNB and the UE. Then having this codebook and using the estimated channel in the UE side, e.g. based on DL reference signals, the UE selects a precoding matrix from the codebook based on some metric, e.g., that maximizes a signal-to-noise ratio (SNR) at the UE when the data transmission is in the DL direction. Each UE feeds an index from the codebook back to the gNB, and the gNB uses this selected-by-UE precoder to transmit the data to the UE. In the current standards for 4G and 5G, there are some predesigned codebooks that may be used for this type of precoding. A common choice of such codebooks is based on a Grid of Beams (GoB), which is essentially a Discrete Fourier Transform (DFT) matrix. In a GoB codebook, each precoding element corresponds to a direction of the main-lobe, e.g. assuming a planar array with uniform element separation and low angular spread. In what follows, we describe a commonly used two-dimensional (2D) antenna arrays and the type-codebook used in NR for detailed explanation of the feedback-based precoding.

2D Antenna Arrays

Two dimensional (2D) antenna arrays may be used and are partly described by the number of antenna columns corresponding to the horizontal dimension $N_h$, the number of antenna rows corresponding to the vertical dimension $N_v$ and the number of dimensions corresponding to different polarizations $N_p$. The total number of antennas is thus $N=N_h N_v N_p$. It should be pointed out that the concept of an antenna is non-limiting in the sense that it can refer to any virtualization, e.g., linear mapping, of the physical antenna elements. For example, pairs of physical sub-elements may be fed the same signal, and hence share the same virtualized antenna port.

An example of a 4×4 array with cross-polarized antenna elements is illustrated in FIG. 1.

The illustration in FIG. 1 is a two-dimensional antenna array of cross-polarized antenna elements, ($N_p$=2), with $N_h$=4 horizontal antenna elements (I) and $N_v$=4 vertical antenna elements (m).

Precoding may be interpreted as multiplying the signal with different beamforming weights for each antenna prior to transmission. A typical approach is to tailor the precoder to the antenna form factor, i.e. taking into account $N_h$, $N_v$ and $N_p$ when designing the precoder codebook.

Type-1 Codebook Based on DFT-Based Precoder

A common type of precoding is to use a Type 1 codebook based on DFT-precoder. The Type 1 codebook can support both single-layer transmission, and multiple layer transmission. For the single layer transmission, the precoder vector is using a single-polarized Uniform Linear Array (ULA) with N antennas be defined as:

$$w_{1D}(k) = \frac{1}{\sqrt{N}} \begin{bmatrix} e^{j2\pi \cdot 0 \cdot \frac{k}{QN}} \\ e^{j2\pi \cdot 1 \cdot \frac{k}{QN}} \\ \vdots \\ e^{j2\pi \cdot (N-1) \cdot \frac{k}{QN}} \end{bmatrix},$$

where k=0, 1, QN−1 is the precoder index and Q is an integer oversampling factor. A corresponding precoder vector for a two-dimensional UPA can be created by taking the Kronecker product of two precoder vectors as $W_{2D}(k, l)=w_{1D}(k) \otimes w_{1D}(l)$. Extending the precoder for a dual-polarized UPA may then be done as:

$$w_{2D,DP}(k, l, \phi) = \begin{bmatrix} 1 \\ e^{j\phi} \end{bmatrix} \otimes w_{2D}(k, l) = \begin{bmatrix} w_{2D}(k, l) \\ e^{j\phi} w_{2D}(k, l) \end{bmatrix} = \begin{bmatrix} w_{2D}(k, l) & 0 \\ 0 & w_{2D}(k, l) \end{bmatrix} \begin{bmatrix} 1 \\ e^{j\phi} \end{bmatrix},$$

where $e^{j\phi}$ is a co-phasing factor that may for instance be selected from QPSK alphabet $$\phi \in \left\{ 0, \frac{\pi}{2}, \pi, \frac{3\pi}{2} \right\}.$$

A precoder matrix $W_{2D,DP}$ for multi-layer transmission may be created by appending columns of DFT precoder vectors as:

$$W_{2D,DP}=[w_{2D,DP}(k_1,l_1,\phi_1) w_{2D,DP}(k_2,l_2,\phi_2) \ldots w_{2D,DP}(k_R,l_R,\phi_R)],$$

where R is the number of transmission layers, i.e. the transmission rank. In a common special case for a rank-2 DFT precoder, $k_1=k_2=k$ and $l_1=l_2=l$, meaning that $$W_{2D,DP} = [w_{2D,DP}(k, l, \phi_1) w_{2D,DP}(k, l, \phi_2)] = \begin{bmatrix} w_{2D}(k, l) & 0 \\ 0 & w_{2D}(k, l) \end{bmatrix} \begin{bmatrix} 1 & 1 \\ e^{j\phi_1} & e^{j\phi_2} \end{bmatrix}.$$

It is typically named the first matrix in the $W_{2D,DP}$ as W_1 and the co-phase matrix as W_2 in the standard codebook.

SUMMARY

As a part of developing embodiments herein a problem was identified by the inventors and will first be discussed.

Current reciprocity-based precoding approaches in the Radio Access Technology (RAT), shows a poor unsatisfying performance for cell-edge UEs. In fact, due to this poor unsatisfying cell-edge performance, a smaller number of UEs are served with reciprocity-based precoding implying that the coverage of the reciprocity-based precoding with legacy algorithms is worse than the feedback-based precoding.

This coverage problem can be traced back to the UL channel estimates obtained from e.g. Sounding Reference Signals (SRS). The UL transmit power is several orders of magnitude lower than the gNB transmit power; hence, the SNR measured by the UL receiver on the SRS is lower than the DL SNR on the channel on which the SRS based precoder is applied. This means that the accuracy of the precoder which is limited by the UL channel estimates, and hence UL SNR, may become unacceptable even in a channel condition where the DL signal quality is still satisfactory.

An object of embodiments herein is to improve the performance of a wireless communications network using reciprocity-based MIMO communication.

According to an aspect of embodiments herein, the object is achieved by a method performed by a network node for creating a precoder for forming a DL beam between the network node and a UE which DL beam is for reciprocity-based MIMO communication in a wireless communications network. The network node obtains matched filter channel estimates for an UL signal, based on a reference signal from the UE known by the network node. The network node obtains a hypothesis testing space within a first precoder codebook, of one polarization, based on the matched filter channel estimates. The network node selects a set of precoder candidates out of the first precoder codebook in accordance with the hypothesis testing space. The network node then creates the precoder for forming the DL beam between the network node and the UE, based on calculating a linear combination of the precoder candidates in the set of precoder candidates.

According to another aspect of embodiments herein, the object is achieved by a network node configured to create a precoder for forming a DL beam between the network node and a UE. The DL beam is arranged for reciprocity-based MIMO communication in a wireless communications network. The network node is further configured to:

Obtain matched filter channel estimates for an UL signal, based on a reference signal from the UE known by the network node, obtain a hypothesis testing space within a first precoder codebook, of one polarization, based on the matched filter channel estimates, select a set of precoder candidates out of the first precoder codebook in accordance with the hypotheses testing space, and create the precoder for forming the DL beam between the network node and the UE, based on calculating a linear combination of the precoder candidates in the set of precoder candidates.

BRIEF DESCRIPTION OF THE DRAWINGS

Examples of embodiments herein are described in more detail with reference to attached drawings in which:

FIGS. 9-12 are flowcharts illustrating methods implemented in a communication system including a host computer, a base station and a user equipment.

DETAILED DESCRIPTION

As a part of developing embodiments herein the problem identified by the inventors will first be further discussed.

Figure 1:
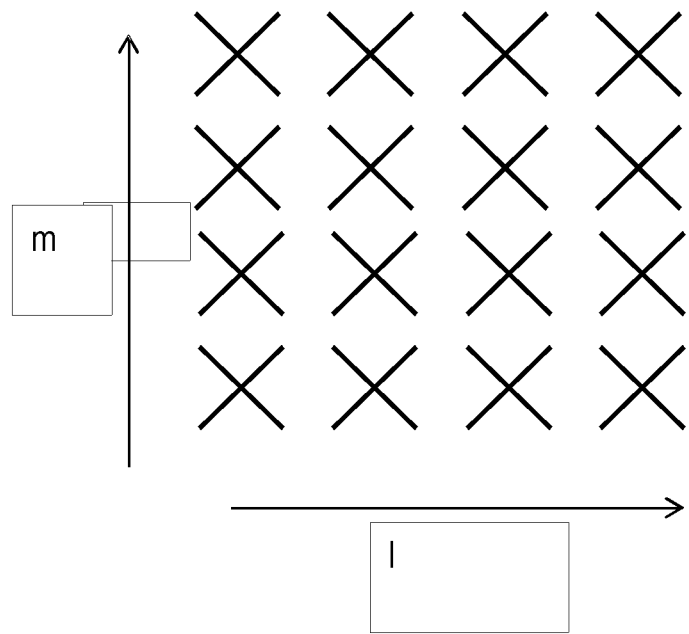
FIG. 1 is a schematic diagram illustrating prior art.
Figure 2:
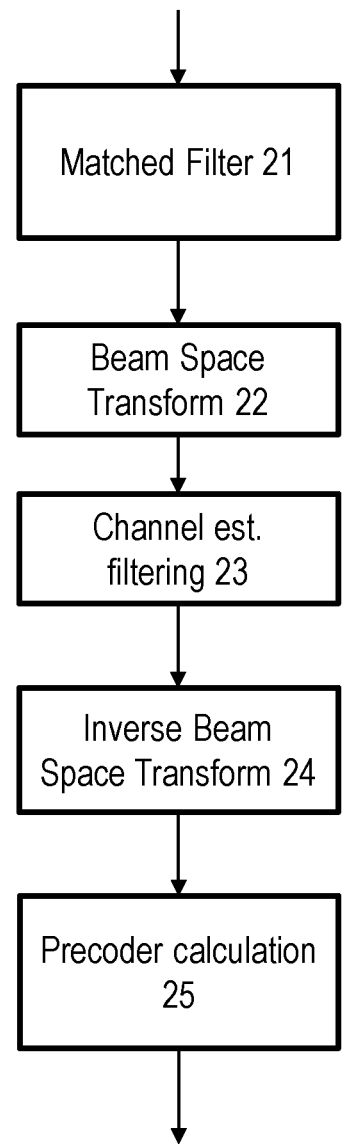
FIG. 2 is a schematic block diagram illustrating prior art.
Figure 3:
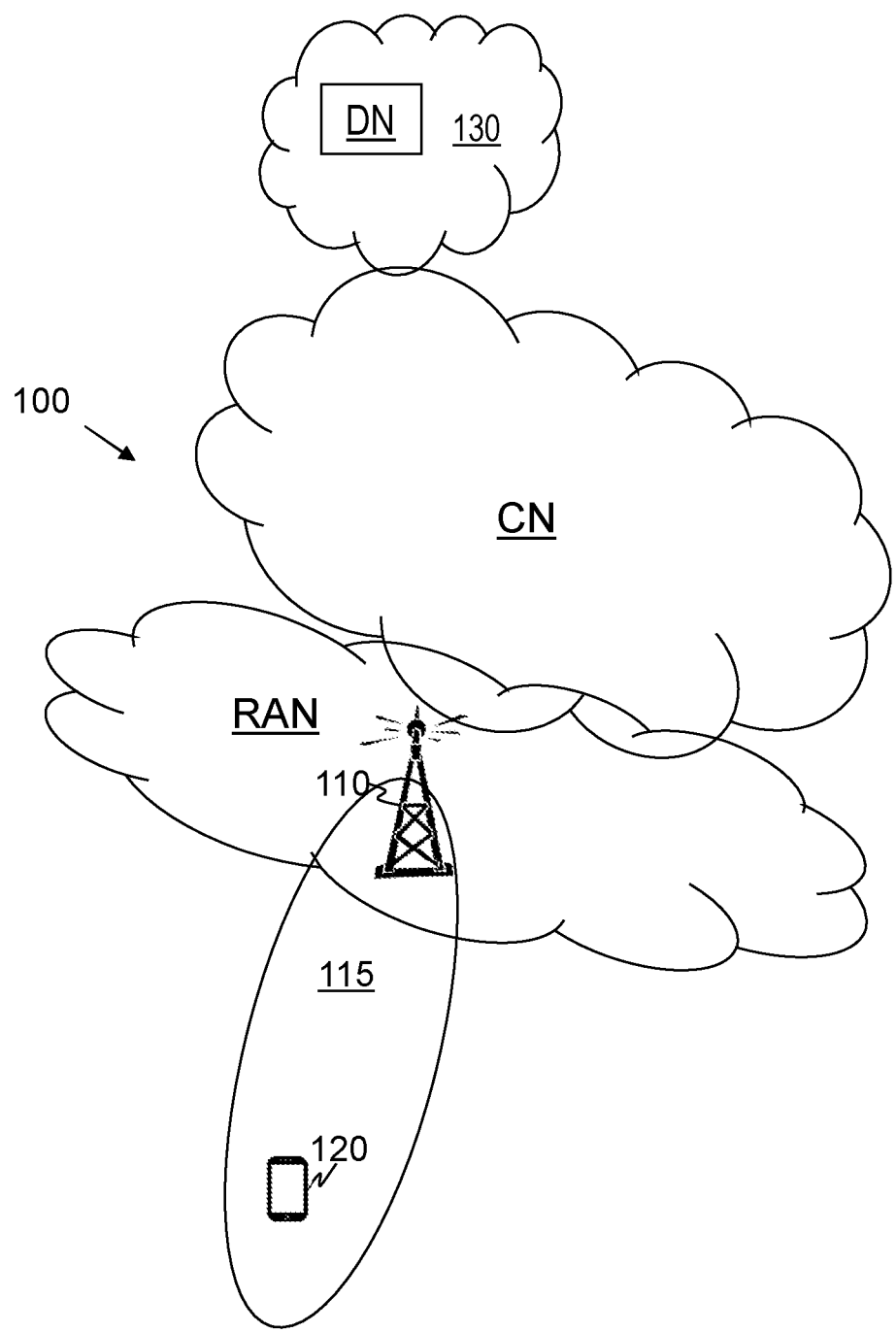
FIG. 3 is a schematic block diagram illustrating embodiments of a wireless communications network.

FIG. 3 depicts an example of SRS processing and DL precoding methods according to prior art. The processing chain may be decomposed into the following units comprising a matched filter unit 21, a beam space transform unit 22, a channel estimation filtering unit 23, an inverse beam space transform unit 24, and a precoder calculation unit 25.

In the Matched filter unit 21, raw estimates at each SRS position are obtained.

In the Beam space transform unit 22, the obtained raw estimates are transformed to the beam domain by typically invertible transformation.

In the Channel estimation filtering unit 23, the beam space transformed channel estimates are filtered, and a filter applied may be e.g. wiener filter or DCT filter.

In the Inverse beam space transform unit 24, a beam domain is inverse transformed to an antenna domain, to get the antenna domain channel estimates.

In the Precoder calculation unit 25, the channel estimates in antenna domain are used for precoder calculation. The precoder may be but is not limited to any of the following three precoders.

A wideband SVD precoder, which uses channel estimates to calculate the wideband channel covariance matrix and applies a Singular Value Decomposition (SVD) on the wideband channel covariance matrix to obtain the eigen vectors. Then use the eigen vectors as precoder.

A subband SVD precoder, which uses channel estimates to calculate the channel covariance matrix for each subband and applies an SVD on the subband channel covariance matrix to obtain eigen vectors. The eigen vectors are then used as precoder for each subband.

A RAIT or RAT, which applies a Minimized Mean Square Error (MMSE) rule to calculate the precoder for each subband. If the interference covariance matrix is applied in the MMSE rule, then it is RAIT precoder. If interference covariance matrix is not applied in the MMSE rule, then it is RAT precoder.

The output of the Matched Filter which comprises the quotient between received reference symbols and corresponding known reference symbols. In some current reciprocity-based precoding methods the output of the Matched Filter (MF), is used to estimate the channel impulse response employing a discrete cosine transform as well as an Akaike's information criterion (AIC) to separate a signal-dominated from a noise-dominated channel taps. It should be noted that the quotient is conceptually at the output of the MF; implementations typically does not do explicit division.

Numerical simulations show that this prior art implementation of a channel estimation requires fairly high per-element SNR to work such as −15 dB as being a good rule-of-thumb. This would then be a barrier for the performance of any reciprocity-based precoding method as this kind of precoding needs a fairly accurate channel estimate to form the beams in the right directions.

Embodiments herein relate to method for creating a precoder for forming a DL beam between a network node and a UE. The method e.g. provides a robust beamforming at extremely low SNR for reciprocity-based MIMO.

The method e.g. provides a precoding scheme that advantageously is used in coverage limited scenarios, e.g. in scenarios with low UL SNR. In some embodiments, a precoder calculation is based on selecting several candidates from a pre-defined codebook and then choose a beamformer which lies in the convec hull of the selected candidates of precoders. The precoder candidates may be selected based on a low complexity measure. The said measure is further used as a confidence of the selected candidates for combining. This means that the total stream energy is spread over the selected candidates, and the precoder after combination will create a wider beam which reflects to the channel uncertainty region.

The output precoder is not limited within the pre-defined codebook. Simulations show significant throughput enhancement at extremely low UL SNR, such as when being below a threshold value. Extremely low UL SNR when used herein e.g. means the UL SNR may be as low as to −30 dB.

To decrease complexity and improve performance, a precoder calculation a method for creating a precoder for forming a DL beam between a network node and a UE is provided. In an example of the method, a wideband beam is selected for each co-polarized antenna array. Then a cophasing parameter is calculated with a numerical equation provided herein. By using the method according to embodiments herein, the complexity for codeword selection will be reduced to the order of QN. This means that with quite small computation effort we can improve the performance of cell-edge UEs.

The provided embodiments herein e.g. have the following advantages.

Low complexity, since the algorithm may only be based on raw estimates at each SRS pilot position, and therefore the channel estimation filtering is possible to bypass.

Robustness, since they improve the SRS based precoding in the coverage limit of a cell and offers a high DL throughput.

Consistence, since they serve as low complexity precoding methods for all SNR range, and not only limited in the low SNR.

Embodiments herein relate to wireless communication networks in general. FIG. 3 is a schematic overview depicting a wireless communications network 100 wherein embodiments herein may be implemented. The wireless communications network 100 comprises one or more RANs and one or more CNs. MIMO communication is used in the wireless communications network 100 The wireless communications network 100 may use a number of different technologies, such as Long Term Evolution (LTE), LTE-Advanced, 5G, NR, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

A number of network nodes operate in the wireless communications network 100 such as e.g. a network node 110. The network node 110 provides radio coverage in a number of cells which may also be referred to as a DL beam or a group of DL beams, such as e.g. comprising a cell 115 provided by the network node 110. The DL beam or group of DL beams are for reciprocity-based MIMO communication in the wireless communications network 100. The network node 110 may comprise two dimensional antenna arrays for the reciprocity-based MIMO communication.

The network node 110 may be any of a NG-RAN node, a transmission and reception point e.g. a base station, a radio access network node such as a Wireless Local Area Network (WLAN) access point or an Access Point Station (AP STA), an access controller, a base station, e.g. a radio base station such as a NodeB, an evolved Node B, e.g. eNB or eNode B, a gNB, a base transceiver station, a radio remote unit, an Access Point Base Station, a base station router, a transmission arrangement of a radio base station, a stand-alone access point or any other network unit capable of communicating with a wireless device within the service area served by the network node 110 depending e.g. on the first radio access technology and terminology used. The radio network node 110 may be referred to as a serving radio network node and communicates with a UE 120 with DL transmissions to the UE 120 and UL transmissions from the UE 120.

In the wireless communication network 100, one or more UEs operate, such as e.g. the UE 120. The UE 120 may also referred to as a device, an IoT device, a mobile station, a non-access point (non-AP) STA, a STA, a user equipment and/or a wireless terminals, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

Methods herein may be performed by the network node 110. As an alternative, a Distributed Node (DN) and functionality, e.g. comprised in a cloud 130 as shown in FIG. 3, may be used for performing or partly performing the methods herein.

A number of embodiments are provided, some of which may be seen as alternatives, while some may be used in combination.

Embodiments herein will first be described in more general way together with FIG. 4. Then, the embodiments herein will be described and exemplified more in detail together with FIG. 5.

Figure 4:
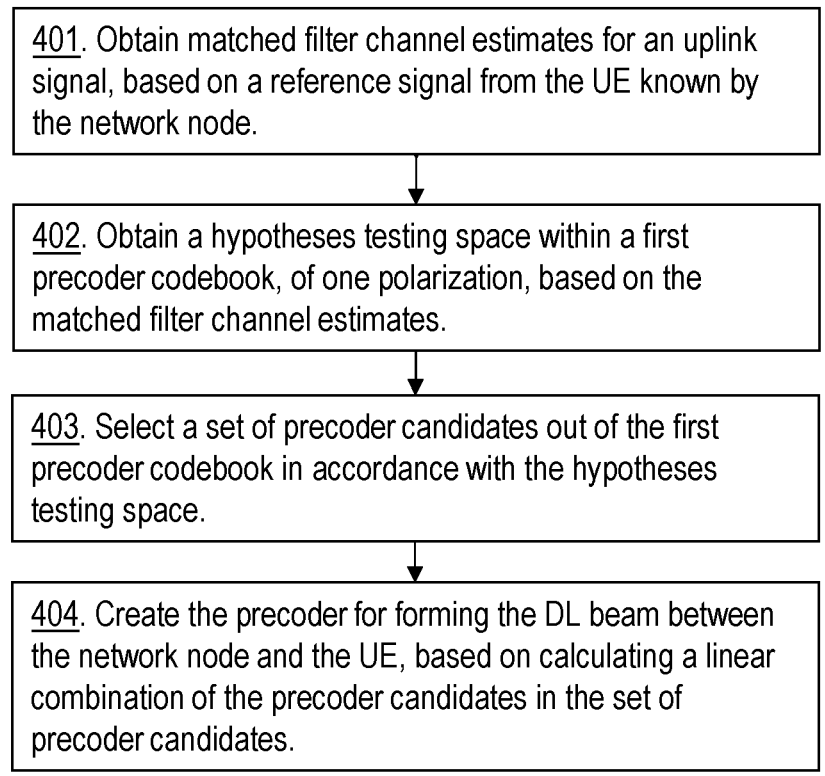
FIG. 4 is a flowchart depicting embodiments of a method in a network node.

FIG. 4 is a flow chart illustrating some example embodiments of a method performed by the network node 110 for creating a precoder for forming a DL beam between the network node 110 and the UE 120. A created precoder may form a DL beam by transforming a sequence of data symbols to another sequence of data symbols, and then map to each antenna port of a radio device such as the network node 110. The DL beam is for reciprocity-based MIMO communication in the wireless communications network 100. In some embodiments, the method is performed when an UL SNR from the UE 120 is below a threshold value. This may mean that the method is performed when an UL SNR from the UE 120 is very low, e.g. when the UE 120 is close to the cell 115 edge.

The method comprises the following actions, which actions may be taken in any suitable order. Optional actions are referred to as dashed boxes in the FIG. 4.

Action 401

The network node 110 obtains matched filter channel estimates for an UL signal, based on a reference signal from the UE 120 known by the network node 110. To obtain matched filter channel estimates means to obtain the raw channel estimates without any noise suppression. The obtaining of matched filter channel estimates may e.g. be performed by the quotient between received reference symbols and corresponding known reference symbols.

In some embodiments, the network node 110 obtains the matched filter channel estimates for the UL signal, by multiplying a same known sequence value at the received UL signal for each subcarrier such that channel coefficients are estimated with the presence of noise, wherein the known sequence value is known from the reference signal.

Action 402

The network node 110 obtains a hypothesis testing space within a first precoder codebook, of one polarization, based on the matched filter channel estimates. The first precoder codebook mentioned here means the codebook that comprises a set of fixed precoders for one antenna polarization.

A hypothesis testing space within the first precoder codebook, is obtained for only one polarization, this is to reduce the computation complexity based on the fact that the the beam direction for two polarizations are the same.

To obtain hypothesis testing space within a first precoder codebook may e.g. mean to formulate all possible transformed channel estimates based on each precoder candidate in the codebook. The obtaining of hypothesis testing space within a first precoder codebook may be performed by multiplication of the channel estimates and each possible precoder candidate in the codebook.

In some embodiments, the obtaining of the hypotheses testing space within the first codebook, of one polarization, based on the matched filter channel estimates is performed by:

Defining a basis precoder structure for the first precoder codebook in a region where an SNR is below a threshold based on precoders for two different polarizations, wherein a same basis precoder is selected for each polarization, and wherein a co-phase factor is applied to the basis precoder to obtain the first precoder codebook, and composing the hypothesis testing space based on the obtained first precoder codebook.

A basis precoder structure when used herein means to use the basis precoder together with a co-phasing factor to form a precoder that is to be applied. A basis precoder when used herein means the precoder in the first precoder codebook that matches the beam direction for each antenna polarization. A co-phase factor when used herein means a complex number that is applied on basis precoder for one of the polarizations.

Action 403

The network node 110 selects a set of precoder candidates out of the first precoder codebook in accordance with the hypothesis testing space. The precoder candidates are selected from the first precoder codebook, e.g. to find the one or more precoder candidates that provides the best performance in terms of receive signal power.

In some embodiments, the selecting of the set of precoder candidates out of the first precoder codebook in accordance with the hypotheses testing space is performed by selecting the set of precoder candidates by selecting a number of precoders out of the first precoder codebook that renders the maximum values over all maximum absolute values of a Finite Impulse Response (FIR) filtered Channel Impulse Response (CIR).

The wording "to render the maximum values over all maximum absolute values" when used herein may mean to calculate a confidence metric of each precoder candidates and select those precoder candidates whose confidence metrics are with maximum values. FIR filtered CIR when used herein means a confidence metric being a linear weighted combination of the values obtained by transforming the CIR within the hypotheses testing space.

Action 404

The network node 110 creates the precoder for forming the DL beam between the network node 110 and the UE 120, based on calculating a linear combination of the precoder candidates in the set of precoder candidates.

In this way, we spread the total stream energy over the selected candidates, and the precoder after combination will create a wider beam which reflects to the channel uncertainty region, so as improve the coverage.

From a communications system perspective, an advantageous benefit of embodiments herein is that they enable a use of reciprocity-based precoding down to a UL SNR lower than what existing state of the art reciprocity-based precoding can offer. This, in turn, offers the following advantages:

An increased DL SNR especially for weak UEs, such as the UE 120, due to an effective DL beamforming. A consequence of this is that a higher throughput for the weak UEs, such as the UE 120, is provided.

A network coverage improvement due to a decrease in the required UL SNR to be served by the network node 110 with reciprocity-based precoding.

An added flexibility in precoding schemes, since the provided method may be more compatible with Multi User (MU)-MIMO than CSI feedback-based schemes, as the codebook of beams is not limited to neither the standardized codebook nor to selecting a single strongest beam.

A less complex RRC configuration apparatus, since UEs, such as the UE 120, falling out of Recent Advances in Information Technology (RAIT) RAT such as coherent reciprocity-based precoding, coverage may still be served without configuring extra CSI reports, or reconfiguring UEs, such as the UE 120, when they fall out of coverage.

An equal performance with a small SRS resource for precoder selection based on reciprocity is provided.

A potential for a use with other UL signals, e.g., Physical Uplink Shared Channel (PUSCH) Demodulation Reference Signal (DMRS), and random-access preambles. This may be very valuable if traffic bursts are short.

A low computing complexity to avoid iterating and searching over a whole precoder codebook in order to locate the best precoder.

The above embodiments will now be further explained and exemplified below. The embodiments below may be combined with any suitable embodiment above.

Figure 5:
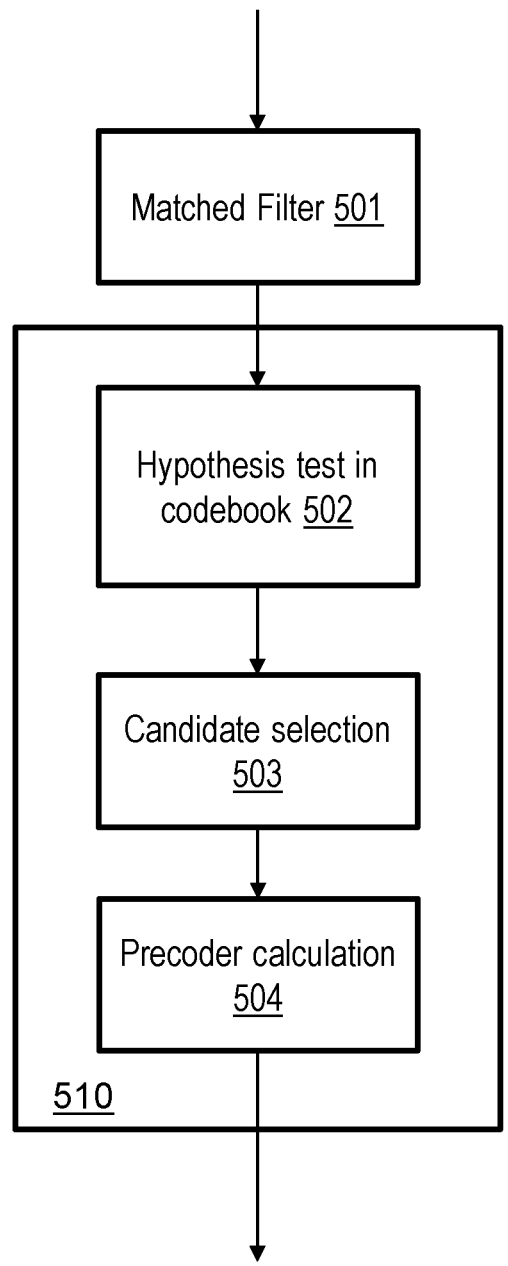
FIG. 5 is a schematic block diagram depicting embodiments herein.

To illustrate the different processing procedure, some embodiments will be described together with a block diagram of FIG. 5. In FIG. 5, the matched filter 501 is related to Action 401 as described above, the hypothesis test in codebook 502 is related to Action 402 as described above, the candidate selection 503 is related to Action 403 as described above, and the precoder calculation 504 is related to Action 404 as described above.

A detailed algorithm description of some example embodiments herein is stated as follows:

Matched Filter 501

The matched filter 501 is related to Action 401 wherein the network node 110 obtains matched filter channel estimates for an UL signal, based on a reference signal from the UE 120 known by the network node 110. This may be performed to eliminate the reference signal impact on the input received signal from UL receiver, and output raw channel estimate without noise suppression.

This may be performed by multiplying the same known sequence value at the received signal for each subcarrier. The received signal comprises a number of subcarriers, i.e., on each subcarrier we have a receive signal. This means that the channel coefficients of the subcarriers are estimated with the presence of noise to obtain the matched filter channel estimates.

If viewed at the hypothesis test in codebook 502, the candidate selection 503, and the precoder calculation 504 as a single entity 510, it has the following input and output:

The input to entity 510 comprises:
Matched filter channel estimates Ḧ, [UE ant, gNB ant, $m_{SRS}$], where $m_{SRS}$ is the length of the SRS sequence in the interest bandwidth, the UE ant is the UE 120 antenna, and the gNB ant is the network node 110 antenna.
A precoder set W, e.g., Type-1 codebook in 3GPP Release 15.

The output from entity 510 comprises:
A precoder W with predefined bandwidth, [gNB ant, stream, subcarrier], wherein gNB ant is the index for gNB antenna, stream is the index for layers, and subcarrier is the index for subcarriers.

Hypothesis Test in Codebook 502

The hypothesis test in codebook 502 is related to Action 402 wherein the network node 110 obtains 402 a hypotheses testing space within a first precoder codebook, of one polarization, based on the matched filter channel estimates.

The purpose of this action 402, 502 may in some embodiments be formulated as the following examples:
To define a precoder structure applicable in a low SNR region of the cell 115. The purpose of this is that the precoder to be created shall be based on precoders for two different polarizations. This means that the precoder structure may exploit the character of polarized antenna array with simplified form.

The same basis precoder will be selected for each polarization. A co-phase factor is applied to the basis precoder so that the whole precoder is obtained. The whole precoder when used herein means the precoder that applies on all the antenna ports of the network node 110, including two polarizations.
A hypothesis space is composed by the basis precoder from the previous step. This is referred as the first precoder codebook.
A time domain effective channel is defined which represents the time domain CIR of the estimated channel after applying a candidate precoder in the said "first precoder codebook". The particular precoder candidate is selected e.g. by selecting the precoder which renders the maximum value over all maximum absolute values of a FIR filtered CIR, e.g., the maximum over all L-infinity norm of the FIR filtered CIR in the equation of Candidate selection for $w_0$ below.

The cophasing factor is chosen based on the selected precoder and its relation with the sample channel covariance matrix see section calculation of cophasing ϕ. Note that in this section, one candidate is as an example of embodiment, however, it may be generalized into a candidate set in the section candidates set forming based on the first precoder codebook below.

Hypothesis Test in Codebook 502 Explained in Details

The effective channel is described as follows. For a matrix, the notation [x, y] represent its dimension, e.g., dimension x by y.

For any rank-1 precoder in the precoder book, define the effective channel in a frequency range of interests:

$$H_{eff}^F = [\ddot{H}_1, \ddot{H}_2, \ldots, \ddot{H}_{m_{SRS}}] I \otimes W, [\text{UE ant,subcarrier}]$$

Here, subscription F represents the frequency units in the granularity for which we aim to use the same precoder W [gNB ant, 1].

Apply FFT on the effective channel to transform the impulse response into time domain:

$$H_{eff}^T = H_{eff}^F F_{dft}, [\text{UE ant,subcarrier}], \text{ where } F_{dft} \text{ represent the DFT matrix}$$

[subcarrier, subcarrier], the superscript T represents the estimates have been transformed into time domain.

Low Complexity Precoder Structure

Denote the precoder as $$W = \begin{bmatrix} w_0 \\ e^{j\phi} w_0 \end{bmatrix}$$

where $w_0$ is a vector with size [gNB ant/2, 1], and ϕ is the cophasing factor.

Denote the matched filter channel estimates $\ddot{H} = [\ddot{H}_{p1}\ \ddot{H}_{p2}]$, where $\ddot{H}_{p1}$ is the channel estimates correspond to the polarization array A of gNB with size [UE ant, gNB ant/2]. where $\ddot{H}_{p2}$ is the channel estimates correspond to the polarization array B of gNB with size [UE ant, gNB ant/2].

Denote the effective channel in a frequency range of interests that corresponds to the polarization A of the antenna array as $$H_{eff,p1}^F = [\ddot{H}_{p1,1}, \ddot{H}_{p1,2}, \ldots, \ddot{H}_{p1,m_{SRS}}] I \otimes W_0, [\text{UE ant,subcarrier}]$$

Denote the effective channel in a frequency range of interests that corresponds to the polarization B of the antenna array as $$H_{eff,p2}^F = [\ddot{H}_{p2,1}, \ddot{H}_{p2,2}, \ldots, \ddot{H}_{p2,m_{SRS}}] I \otimes W_0, [\text{UE ant,subcarrier}]$$

Denote wideband beam set for $w_0$ as $W_0$

Candidate Selection for $w_0$

Define a FIR filter vector $\Theta^T = [\theta_1, \theta_2, \ldots, \theta_L]$ with $\theta_i \geq 0$ and L>0 being the tuning parameter.

The wideband beam for each polarization array can be selected as $$w_0^{opt} = \underset{w_0}{\arg\max} \sum_{u \backslash in\ UE\_ants} (|\Theta^T \odot |H_{eff,p1}^T [u,:]|_\infty)^2 +$$

$$(|\Theta^T \odot |H_{eff,p2}^T [u,:]|_\infty)^2, \forall w_0 \in w_0,$$

⊙ represents the convolution operation.

Calculation of Cophasing ϕ

Denote the covariance matrix obtained based on matched filter channel estimates as $$R = \sum_u \ddot{H}_u^H \ddot{H}_u = \begin{bmatrix} R_{11} R_{12} \\ R_{21} R_{22} \end{bmatrix}$$

The matrix R is in dimension of [gNB ant, gNB ant]. And submatrix $R_{ij}$ is [gNB ant/2, gNB ant/2].

The cophasing factor can be calculated based on the following optimization problem $$\phi^{opt} = \underset{\phi}{\arg\max} [w_0^H e^{-j\phi} w_0^H] R \begin{bmatrix} w_0 \\ e^{j\phi} w_0 \end{bmatrix},$$

The solution for the optimization problem is $$\phi^{opt} = \arg\{w_0^H R_{21} w_0\}$$

where the operation of arg{.} means the phase of complex value.

Formulation of the Precoder

The precoder can be then formulated as $$W = \begin{bmatrix} w_0^{opt} \\ e^{j\phi^{opt}} w_0^{opt} \end{bmatrix}$$

Robust Phase Calculation

In order to improve the robustness of the calculated phase, quantization to $\phi$ can also be further considered as follows $$\phi_q^{opt} = n_q \frac{\pi}{2}$$

where $n_q = \underset{n=0,1,2,3}{\operatorname{argmin}}\left(\phi^{opt} - n\frac{\pi}{2}\right)$, Candidate Selection 503

The candidate selection 503 is related to Action 403 wherein the network node 110 selects a set of precoder candidates out of the first precoder codebook in accordance with the hypotheses testing space.

The candidates set forming, also referred to as the selection off the set of precoder candidates, is based on the first precoder codebook.

In the above section Hypothesis test in codebook 502 explained in details, an example is given where the maximum is chosen as the only candidate. In this action, a number of candidates, e.g. larger or equal to 1, are chosen, i.e. selected, to form a set following a similar principle as described in said above section in a peeling-and-greedy way.

The Candidate selection may be performed according to the following example:

Define a FIR filter vector $\Theta^T = [\theta_1, \theta_2, \ldots, \theta_L]$ with $\theta_i \geq 0$ and L>0 being the tuning parameter.

Define a variable b to represent the number of selected candidates in the codebook. The candidates $W_i$, $i \in [1: b]$ are selected as follows, each with a confidence metric $m(W_i)$:

$$W_1 = \underset{W}{\operatorname{argmax}} \sum_u \left(\left\|\Theta^T \odot \left|H_{eff}^T[u,:]\right|\right\|_\infty\right)^2, \forall W \in W,$$

$$m(W_1) = \sum_u \left(\left\|\Theta^T \odot \left|H_{eff}^T[u,:]\right|(W = W_1)\right\|_\infty\right)^2,$$

$$W_2 = \underset{W}{\operatorname{argmax}} \sum_u \left(\left\|\Theta^T \odot \left|H_{eff}^T[u,:]\right|\right\|_\infty\right)^2, \forall W \in W/W_1,$$

$$m(W_2) = \sum_u \left(\left\|\Theta^T \odot \left|H_{eff}^T[u,:]\right|(W = W_2)\right\|_\infty\right)^2,$$

...

$$W_b = \underset{W}{\operatorname{argmax}} \sum_u \left(\left\|\Theta^T \odot \left|H_{eff}^T[u,:]\right|\right\|_\infty\right)^2, \forall W$$

$\in W/\{W_1, W_2, \ldots, W_{b-1}\}$, $$m(W_b) = \sum_u \left(\left\|\Theta^T \odot \left|H_{eff}^T[u,:]\right|(W = W_b)\right\|_\infty\right)^2,$$

Precoder Calculation 504

The precoder calculation 504 is related to Action 404 wherein the network node 110 creates the precoder for forming the DL beam between the network node 110 and the UE 120, based on calculating a linear combination of the precoder candidates in the set of precoder candidates.

Here, the idea is to use a linear combination of the precoders in the candidate set to form a new precoder. In such a way, the newly formed precoder are robust against channel estimation errors which forms a wider angle of directions. The precoder calculation may be performed according to the following example:

Define the output precoder as W*. It may be calculated as $W^* = \Sigma \alpha_i W_i, \alpha_i \geq 0$, and $\Sigma \alpha_i = 1, W_i \in w, i \in [1:b]$ Where the alpha value is defined as $$\alpha_i = \frac{m(W\_i)}{\sum_{i=[1:b]} m(W\_i)}$$

A summary of the method according to embodiments herein, may comprise the following:

Regarding Action 401, to avoid going through an unstable SNR region for the legacy channel estimation filtering, e.g., DCT with window selection, the method according to embodiments herein directly works on top of the matched filter estimates. This means that the effort of legacy channel estimation filtering operation can be saved while achieve even better performance.

Regarding Action 402, the hypotheses testing space is reduced to within the codebook of one polarization. This means that to search for precoder candidates only corresponding to Therefore, the complexity has been reduced to be a quarter compared to brute force search over the whole precoder codebook.

Regarding Action 403, In order to combat with the channel knowledge uncertainty, several codewords from the codebook are selected based on a metric which estimates the sum power of the effective channel (both in spatial and in time domain) by choosing the corresponding codework.

Regarding Action 404, The best precoder in terms of throughput in the codebook most likely falls into the selected codewords set. In this action, it is dealt with the channel uncertainty by increasing the size of the candidate set. This step is motivated by the facts that in the extremely low SNR, there may exist multiple codewords rendering similar said metrics. The total stream energy is spread over the selected codewords, in other words, linear combination of candidates is used to create a new precoder. In the extremely low SNR regime, this will most likely create a wider beam which reflects to the channel uncertainty region.

A metric in the hypotheses space at the −30 dB and 0 dB UL SNR for a particular channel instance, respectively. The antenna setting is 16 gNB antennas and 2 UE antennas, with SRS bandwidth 52 RBs. The clusters in the metric space motivate us to select several good candidates for later combining.

The total stream energy is spread over the selected codewords, in other words, use the linear combination of candidates to create a new precoder. In the extremely low SNR regime, this will most likely create a wide beam which reflects to the channel uncertainty region.

A metric surface plot at −30 dB UL SNR, with a two dimensional metric space may be defined following a definition in the candidate selection part. Specifically, for any codeword W described in the W1, W2 decomposition, $W = W_i W_j$, m(i, j) i=[1:128], j=[1:4] (i is the codeword index in W1 codebook, j is the index in W2 cophasing codebook) represents the said metric m(W).

To perform the method actions above, the network node 110 is configured to create a precoder for forming a DL beam between the network node 110 and a UE 120, which DL beam is arranged for reciprocity-based MIMO communication in the wireless communications network 100. The network node 110 may comprise an arrangement depicted in FIGS. 6a and 6a.

The network node 110 may comprise an input and output interface 600 configured to communicate with UEs such as the UE 120 The input and output interface 600 may comprise a wireless receiver (not shown) and a wireless transmitter (not shown).

The network node 110 may further be configured to, e.g. by means of a obtaining unit 610 in the network node 110, obtain matched filter channel estimates for an UL signal, based on a reference signal from the UE 120 known by the network node 110.

The network node 110 may further be configured to, e.g. by means of the obtaining unit 610 in the network node 110, obtain a hypotheses testing space within a first precoder codebook, of one polarization, based on the matched filter channel estimates.

The network node 110 may further be configured to, e.g. by means of the obtaining unit 610 in the network node 110, obtain the hypotheses testing space within the first codebook, of one polarization, based on the matched filter channel estimates by:
 defining a basis precoder structure for the first precoder codebook in a region where an SNR is below a threshold based on precoders for two different polarizations, wherein a same basis precoder is arranged to be selected for each polarization, and wherein a co-phase factor is adapted to be applied to the basis precoder to obtain the first precoder codebook, and
 composing the hypothesis testing space based on the obtained first precoder codebook.

The network node 110 may further be configured to, e.g. by means of the obtaining unit 610 in the network node 110, obtain the matched filter channel estimates for the UL signal, by:
 multiplying a same known sequence value, at the received UL signal for each subcarrier, wherein channel coefficients are adapted to be estimated with the presence of noise, and wherein the known sequence value is adapted to be known from the reference signal.

The network node 110 may further be configured to, e.g. by means of a selecting unit 620 in the network node 110, select a set of precoder candidates out of the first precoder codebook in accordance with the hypotheses testing space.

The network node 110 may further be configured to, e.g. by means of the selecting unit 620 in the network node 110, select the set of precoder candidates out of the first precoder codebook in accordance with the hypotheses testing space by:
 selecting a number of precoders out of the first precoder codebook that renders the maximum values over all maximum absolute values of a FIR filtered CIR.

The network node 110 may further be configured to, e.g. by means of a creating unit 630 in the network node 110, create the precoder for forming the DL beam between the network node 110 and the UE 120, based on calculating a linear combination of the precoder candidates in the set of precoder candidates.

The network node 110 may further be configured to, e.g. by means of the creating unit 630 in the network node 110, create the precoder for forming the DL beam between the network node 110 and the UE 120, when an UL SNR from the UE 120 is below a threshold value.

Figure 6A:
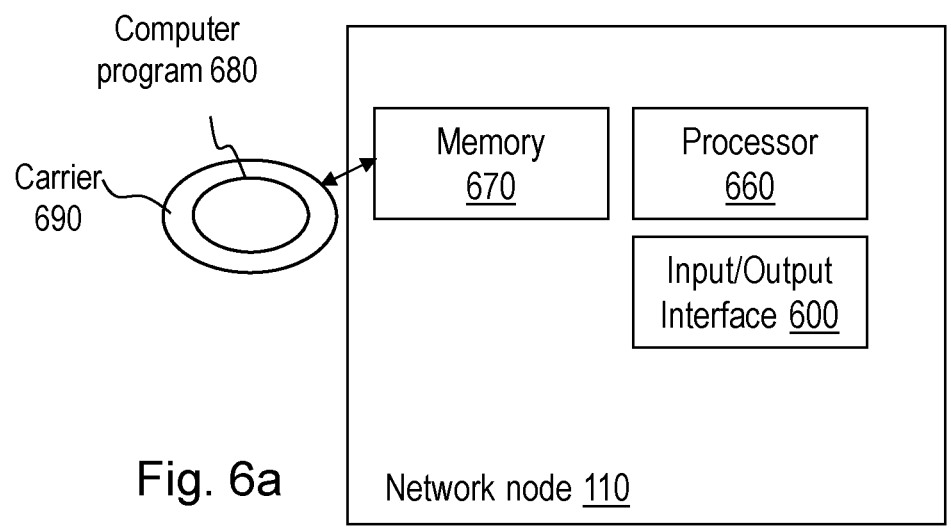
FIG. 6a-b are schematic block diagrams illustrating embodiments of a network node.
Figure 6B:
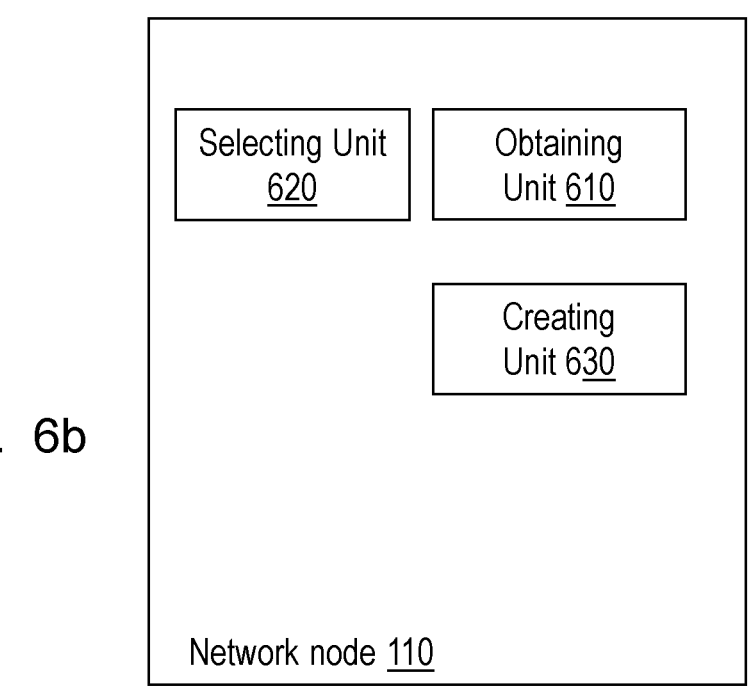

The embodiments herein may be implemented through a respective processor or one or more processors, such as the processor 660 of a processing circuitry in the network node 110 depicted in FIG. 6a, together with respective computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 670 comprising one or more memory units. The memory 670 comprises instructions executable by the processor in network node 110. The memory 670 is arranged to be used to store e.g. information, indications, data, configurations, codebooks, precoders, sequence values, and applications to perform the methods herein when being executed in the network node 110.

In some embodiments, a computer program 680 comprises instructions, which when executed by the respective at least one processor 660, cause the at least one processor of the network node 110 to perform the actions above.

In some embodiments, a respective carrier 690 comprises the respective computer program 680, wherein the carrier 690 is one of an electronic signal, an optical signal, an electromagnetic signal, a magnetic signal, an electric signal, a radio signal, a microwave signal, or a computer-readable storage medium.

Those skilled in the art will appreciate that the units in the network node 110 described above may refer to a combination of analog and digital circuits, and/or one or more processors configured with software and/or firmware, e.g. stored in the network node 110, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 7:
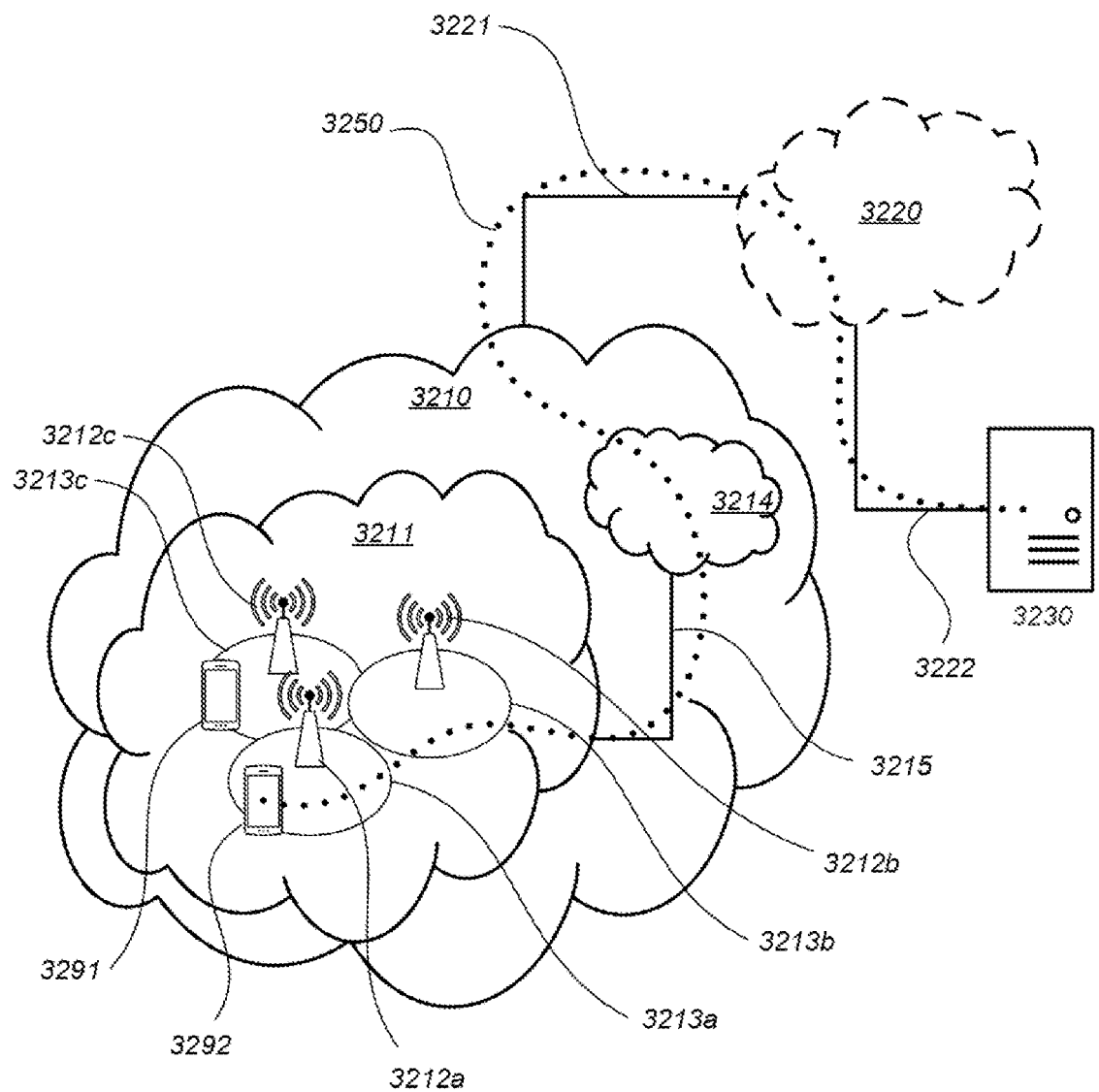
FIG. 7 schematically illustrates a telecommunication network connected via an intermediate network to a host computer.

With reference to FIG. 7, in accordance with an embodiment, a communication system includes a telecommunication network 3210, such as a 3GPP-type cellular network, e.g. wireless communications network 100, which comprises an access network 3211, such as a radio access network, and a core network 3214. The access network 3211 comprises a plurality of base stations 3212a, 3212b, 3212c, such as AP STAs NBs, eNBs, gNBs, e.g. the network node 110, or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) such as a Non-AP STA 3291, e.g. UE 120, located in coverage area 3213c is configured to wirelessly connect to, or be paged by, the corresponding base station 3212c. A second UE 3292 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 7 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 8. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 8) served by the base station 3320. The communication interface 3326 may be configured to facilitate a connection 3360 to the host computer 3310. The connection 3360 may be direct or it may pass through a core network (not shown in FIG. 8) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 8 may be identical to the host computer 3230, one of the base stations 3212a, 3212b, 3212c and one of the UEs 3291, 3292 of FIG. 7, respectively. This is to say, the inner workings of these entities may be as shown in FIG. 8 and independently, the surrounding network topology may be that of FIG. 7.

Figure 8:
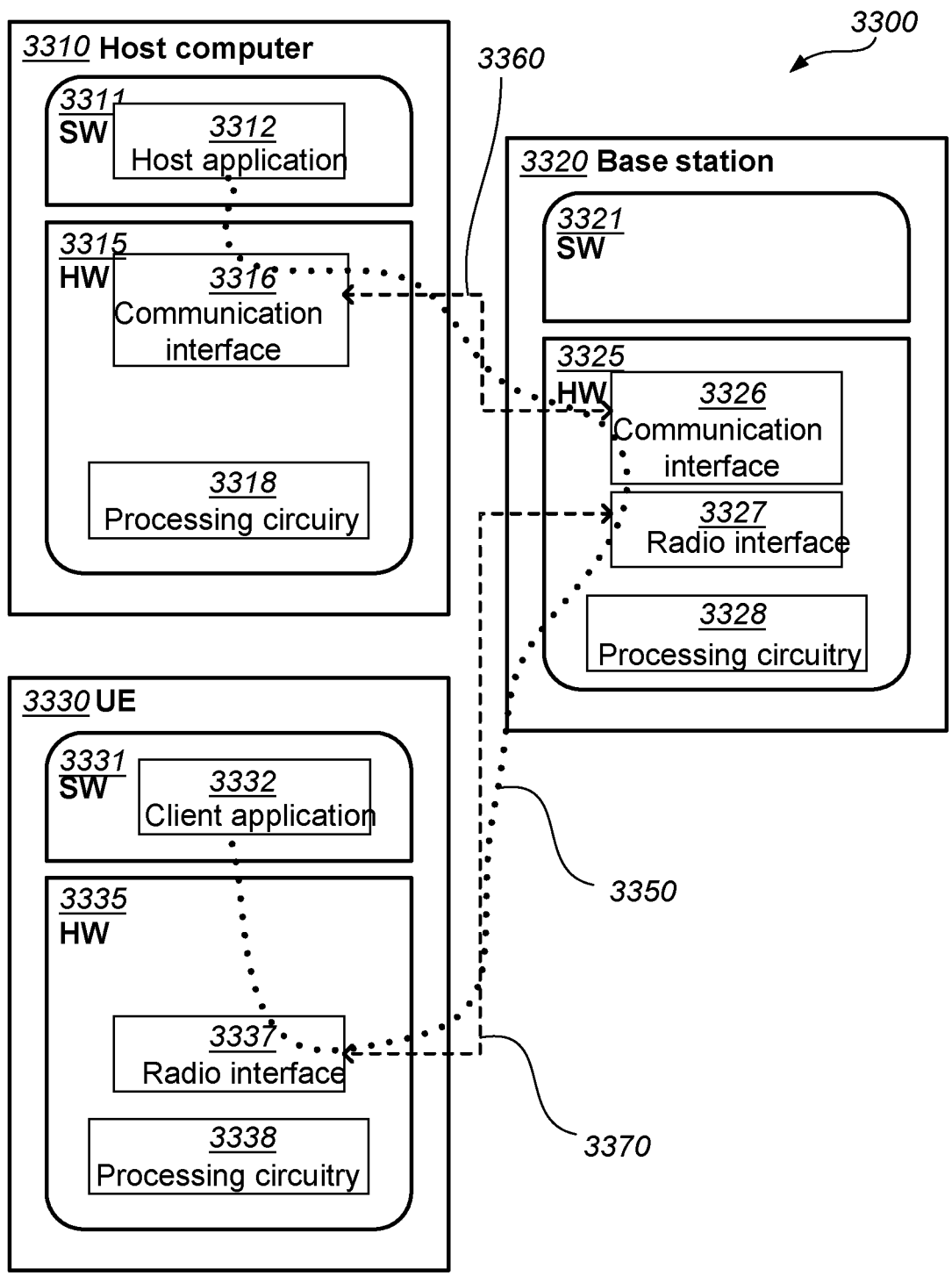
FIG. 8 is a generalized block diagram of a host computer communicating via a base station with a user equipment over a partially wireless connection.

In FIG. 8, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing, e.g., on the basis of load balancing consideration or reconfiguration of the network.

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the RAN effect: data rate, latency, power consumption, and thereby provide benefits such as corresponding effect on the OTT service: reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 9 is a flowchart illustrating a method implemented in a communication system, in accordance with one embodiment. The communication system includes a host computer, a base station such as an AP STA, and a UE such as a Non-AP STA which may be those described with reference to FIG. 7 and FIG. 8. For simplicity of the present disclosure, only drawing references to FIG. 9 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 10 is a flowchart illustrating a method implemented in a communication system, in accordance with one embodiment. The communication system includes a host computer, a base station such as a AP STA, and a UE such as a Non-AP STA which may be those described with reference to FIG. 7 and FIG. 8. For simplicity of the present disclosure, only drawing references to FIG. 10 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 11:
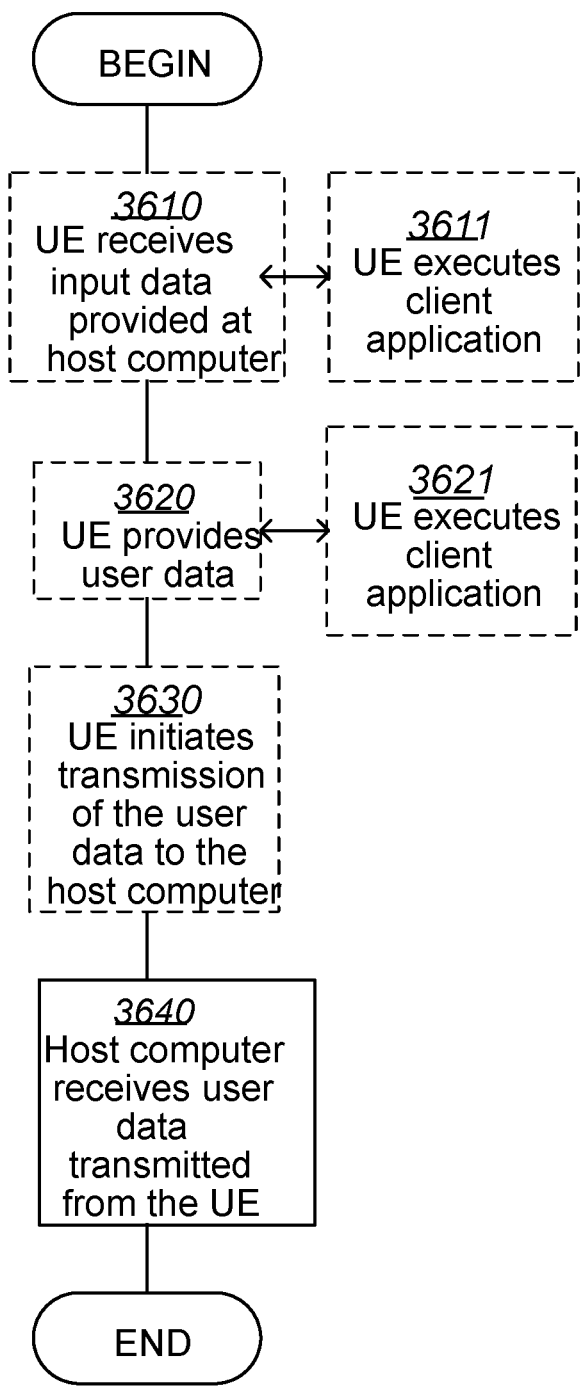

FIG. 11 is a flowchart illustrating a method implemented in a communication system, in accordance with one embodiment. The communication system includes a host computer, a base station such as a AP STA, and a UE such as a Non-AP STA which may be those described with reference to FIG. 7 and FIG. 8. For simplicity of the present disclosure, only drawing references to FIG. 11 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 12:
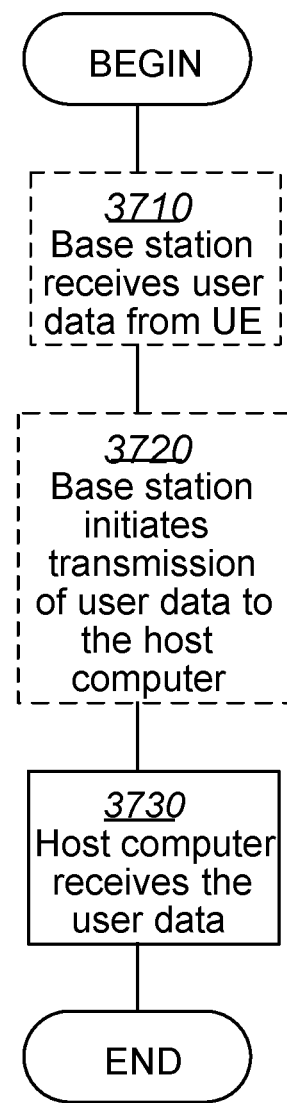

FIG. 12 is a flowchart illustrating a method implemented in a communication system, in accordance with one embodiment. The communication system includes a host computer, a base station such as a AP STA, and a UE such as a Non-AP STA which may be those described with reference to FIG. 7 and FIG. 8. For simplicity of the present disclosure, only drawing references to FIG. 12 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a network node for creating a precoder for forming a Downlink, DL, beam between the network node and a User Equipment, UE, which DL beam is for reciprocity-based Multiple Input Multiple Output, MIMO, communication in a wireless communications network, the method comprising:
  obtaining matched filter channel estimates for an Uplink, UL, signal, based on a reference signal from the UE known by the network node,
  obtaining a hypothesis testing space within a first precoder codebook, of one polarization, based on the matched filter channel estimates,
  selecting a set of precoder candidates out of the first precoder codebook in accordance with the hypothesis testing space, creating the precoder for forming the DL beam between the network node and the UE, based on calculating a linear combination of the precoder candidates in the set of precoder candidates.

2. The method according to claim 1, wherein the method is performed when an UL Signal to Noise Ratio, SNR, from the UE is below a threshold value.

3. The method according to claim 1, wherein the obtaining of the hypothesis testing space within the first precoder codebook, of one polarization, based on the matched filter channel estimates is performed by:
defining a basis precoder structure for the first precoder codebook in a region where an SNR is below a threshold based on precoders for two different polarizations, wherein a same basis precoder is selected for each polarization, and wherein a co-phase factor is applied to the basis precoder to obtain the first precoder codebook,
composing the hypothesis testing space based on the obtained first precoder codebook.

4. The method according to claim 1, wherein the selecting of the set of precoder candidates out of the first precoder codebook in accordance with the hypothesis testing space is performed by:
selecting the set of precoder candidates by selecting a number of precoders out of the first precoder codebook that renders the maximum values over all maximum absolute values of a Finite Impulse Response, FIR, filtered Channel Impulse Response, CIR.

5. The method according to claim 1, wherein the obtaining of the matched filter channel estimates for the UL signal, is performed by:
multiplying a same known sequence value, at the UL signal for each subcarrier such that channel coefficients are estimated with the presence of noise, wherein the known sequence value is known from the reference signal.

6. A non-transitory computer readable-medium comprising instructions, which when executed by a processor of a network node for creating a precoder for forming a Downlink (DL) beam between the network node and a User Equipment (UE) which DL beam is for reciprocity-based Multiple Input Multiple Output (MIMO) communication in a wireless communications network, causes the processor to:
obtain matched filter channel estimates for an Uplink (UL) signal, based on a reference signal from the UE known by the network node,
obtain a hypothesis testing space within a first precoder codebook, of one polarization, based on the matched filter channel estimates,
select a set of precoder candidates out of the first precoder codebook in accordance with the hypothesis testing space, and
create the precoder for forming the DL beam between the network node and the UE, based on calculating a linear combination of the precoder candidates in the set of precoder candidates.

7. A network node configured to create a precoder for forming a Downlink, DL, beam between the network node and a User Equipment, UE, which DL beam is arranged for reciprocity-based Multiple Input Multiple Output, MIMO, communication in a wireless communications network, wherein the network node is further configured to:
obtain matched filter channel estimates for an Uplink, UL, signal, based on a reference signal from the UE known by the network node,
obtain a hypothesis testing space within a first precoder codebook, of one polarization, based on the matched filter channel estimates,
select a set of precoder candidates out of the first precoder codebook in accordance with the hypothesis testing space,
create the precoder for forming the DL beam between the network node and the UE, based on calculating a linear combination of the precoder candidates in the set of precoder candidates.

8. The network node according to claim 7, further configured to create the precoder for forming the DL beam between the network node and the UE, when an UL Signal to Noise Ratio, SNR, from the UE is below a threshold value.

9. The network node according to claim 7, further being configured to:
obtain the hypothesis testing space within the first precoder codebook, of one polarization, based on the matched filter channel estimates by:
defining a basis precoder structure for the first precoder codebook in a region where an SNR is below a threshold based on precoders for two different polarizations, wherein a same basis precoder is arranged to be selected for each polarization, and wherein a co-phase factor is adapted to be applied to the basis precoder to obtain the first precoder codebook, and
composing the hypothesis testing space based on the obtained first precoder codebook.

10. The network node according to claim 7, further configured to:
select the set of precoder candidates out of the first precoder codebook in accordance with the hypothesis testing space by:
selecting a number of precoders out of the first precoder codebook that renders the maximum values over all maximum absolute values of a Finite Impulse Response, FIR, filtered Channel Impulse Response, CIR.

11. The network node according to claim 7, further configured to:
obtain the matched filter channel estimates for the UL signal, by:
multiplying a same known sequence value, at the UL signal for each subcarrier, wherein channel coefficients are adapted to be estimated with the presence of noise, and wherein the known sequence value is adapted to be known from the reference signal.

* * * * *